Patented Mar. 18, 1930

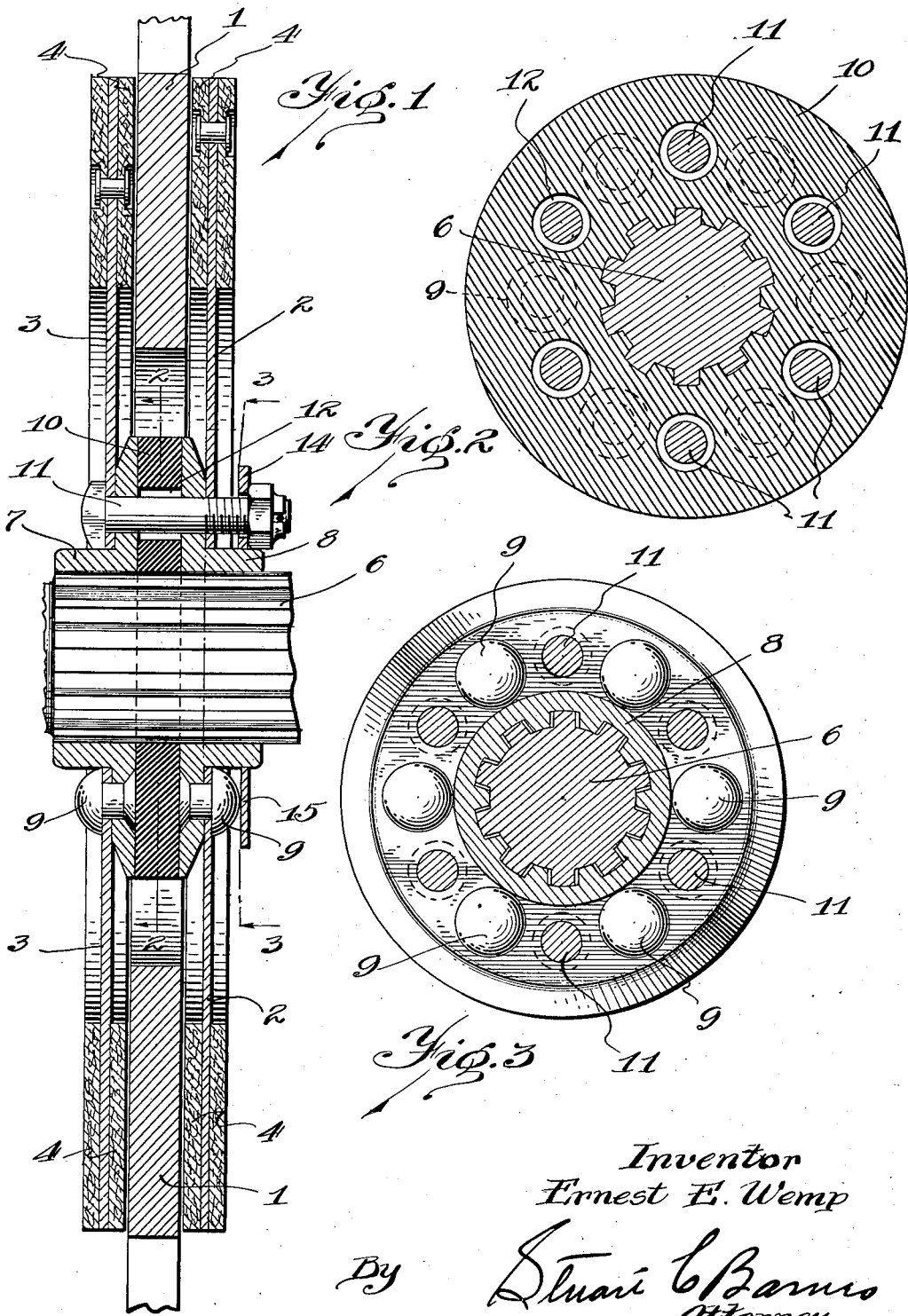

1,750,827

UNITED STATES PATENT OFFICE

ERNEST E. WEMP, OF DETROIT, MICHIGAN

VIBRATION DAMPENER

Application filed January 29, 1927. Serial No. 164,631.

The present invention relates to a vibration dampener which is useful in automotive vehicles employing internal combustion engines.

It is well known that internal combustion engines have certain periods of vibration, and the vibrations are delivered through the driving mechanism and set up in the running gear and chassis of the automotive vehicle. It is objectionable to have vibrations in the engine, and in the running gear and chassis, and the present invention is devoted to the dampening or overcoming of the period vibrations in the engine and for preventing the period vibrations from being set up in the running gear and chassis.

In accordance with the invention, a member of the mechanism, which is driven by the engine, is constructed of parts which are movable relative to each other but which relative movement is resisted after the manner of a braking action. Engine vibration tends to cause such relative movement and the resistance to this movement acts to dampen the vibrations.

It is desirable to dampen the vibrations near the engine and to prevent the vibrations from reaching as many of the driven members as possible, and for this purpose the dampener construction can be advantageously embodied in a clutch which is the connecting means between the driven mechanism, including the running gear, etc., and the engine.

In the accompanying drawings:

Fig. 1 is a sectional view taken through a clutch which embodies the dampener construction of the invention.

Fig. 2 is a sectional view taken on line 2—2 of Fig. 1.

Fig. 3 is a sectional view taken on the line 3—3 of Fig 1.

In the accompanying drawings the driving member of a clutch is referenced 1. and the driven member is constituted by disks 2 and 3, each having suitable facing material 4 for frictional engagement with the driving member.

The driven member includes a hub construction splined onto a shaft 6. The hub construction includes a hub part 7 and a hub part 8, and each disk is securely fixed to a hub part, as by means of rivets 9. The hub parts 7 and 8 are loosely splined onto the shaft; that is, the splined construction is such as to permit of a limited relative rotative movement as between the shaft and the said two hub parts. By reference to Fig. 3 it will be noted that the splined construction forms a loose fit; the looseness in practice is such as to permit of a relative movement of a few hundredths (say 4) of an inch, but for the purpose of clearness it has been exaggerated in Fig. 3. This few hundredths of an inch movement will result in about a one-fourth inch movement at the periphery.

Disposed between the two hub parts 7 and 8 is an additional part 10 which is also splined to the shaft but in a tight manner, as shown in Fig. 2, so that there is no relative movement between the shaft and this part 10. Part 10 is preferably made of a composition such as used for making silent gears.

The several hub parts are connected together by bolts 11 which are taken through the members, as shown in Fig. 1. The bolts have a tight fit with the hub parts 7 and 8 but the intermediate part 10 is provided with an opening 12 which is larger than the bolt. The bolts 11 are also taken through a ring member 14 which is made of spring metal, and this ring member rests upon the heads of the rivets 9, as shown at 15. Inasmuch as the rivets and bolts alternate (see Fig. 3) the several hub parts are clamped together under a spring action, as the ring can be somewhat distorted by tightening of the bolts.

In the operation of the device, the disc members 2 and 3 and their respective hub parts are rotated to thus cause rotation of the shaft 6. When the engine reaches a vibration period, such vibrations are communicated through the driving member 1 to the driven parts 2 and 3 and their hub parts, and there is a tendency for backward movement of these driven parts relative to the shaft 6 which is permitted by the loose spline construction. Such a relative movement is resisted by surface friction between the intermediate member 10 and the two members 7 and 8 inasmuch as the member 10 is fast to the shaft. The frictional engagement between these members is under spring tension, and when the vibrations tend to move the driven members relative to the shaft the frictional engagement with the intermediate member 10 acts after the manner of a brake. This serves to dampen or overcome the vibrations in the engine itself, and at the same time serves to stop the vibrations from reaching the shaft 6 from where the vibrations would be communicated to the running gear and chassis. While the relative movement permitted by the loose spline is relatively small, such movement is considerably increased or magnified at the point where the facing material of the driven discs frictionally engage the driving member 1.

The invention is illustrated in connection with a multiple plate clutch, but is obviously applicable to a single plate.

I claim:

1. In a clutch, the combination of a driving member, a driven member, a hub for the driven member, a shaft loosely connected to the hub, said driving and driven members engaging each other at a point radially removed from the hub, said loose connection permitting relative movement between the shaft and the hub upon engine vibration, means rigidly fixed to the shaft and having frictional engagement with the hub, and spring means for effecting a tension on said frictional engagement, said frictional engagement being caused to slip upon relative movement set up by engine vibrations to act in opposition to said relative movement to dampen the vibrations in the engine with this slipping movement multiplied at the engagement between the driving and driven members.

2. In a clutch, the combination of a driving member which is driven by an engine, a driven disc frictionally engaging the driving member near the periphery of the disc, a hub for the disc, a shaft upon which the hub is splined with the splines loosely fitting to permit relative rotational movement between the shaft and hub, a member tightly splined to the shaft, bolts for bolting this member and hub together, one of said members having openings through which the bolts extend which are larger than the bolts to permit relative movement between the member and hub when vibrations are set up, this relative movement being close to the shaft and being multiplied at the periphery of the disc where the same engages the driving member.

3. In a clutch, the combination of a driving member which is driven by an engine, a driven disc frictionally engaging the driving member near the periphery of the disc, a hub for the disc, a shaft upon which the hub is splined with the splines loosely fitting to permit relative rotational movement between the shaft and hub, a member tightly splined to the shaft, bolts for bolting this member and hub together, one of said members having openings through which the bolts extend which are larger than the bolts to permit relative movement between the member and hub when vibrations are set up, this relative movement being close to the shaft and being multiplied at the periphery of the disc where the same engages the driving member, and spring means acting in conjunction with the bolts for effecting tight frictional engagement between the hub and said member.

4. In a clutch, the combination of a driving member which is driven by an engine, a pair of driven discs, one on each side of the driving member which engage the driving member near their peripheries, a hub for each disc, a shaft upon which the hubs are splined with the splined connection being loose to permit relative rotational movement between the hubs and shaft, a member tightly splined to the shaft and disposed between the hubs, bolts extending through the hubs and the said member for clamping them all together, said member having bolt openings which are larger than the bolts to permit relative movement between this member and the hubs, which relative movement is close to the shaft and materially multiplied near the peripheries of the discs where they engage the driving member.

5. In a clutch, the combination of a driving member which is driven by an engine, a pair of driven discs, one on each side of the driving member which engage the driving member near their peripheries, a hub for each disc, a shaft upon which the hubs are splined with the splined connection being loose to permit relative rotational movement between the hubs and shaft, a member tightly splined to the shaft and disposed between the hubs, bolts extending through the hubs and the said member for clamping them all together, said member having bolt openings which are larger than the bolts to permit relative movement between this member and the hubs, which relative movement is close to the shaft and materially multiplied near the peripheries of the discs where they engage the driving member, and spring means acting in conjunction with the bolts for effecting a tight frictional engagement between the hubs and the said intermediate member.

6. In a clutch, the combination of a driving member, a driven disc frictionally engaging the driving member near the periphery of the driven disc, a shaft, a hub for the driven disc, means connecting the hub and shaft so as to provide for a positive driving connection between said hub and shaft, said means permitting of limited relative movement between the hub and shaft, means tightly fixed to said shaft and having a frictional surface to surface engagement with said hub, said connection between the hub and shaft permitting relative movement when vibrations are received by the driven member from the driving member, said relative movement being materially multiplied near the periphery of the driven disc where it frictionally engages the driving member, and said tightly fixed means on the shaft frictionally opposing said relative movement.

In testimony whereof I have affixed my signature.

ERNEST E. WEMP.